United States Patent
Seager et al.

(10) Patent No.: US 9,292,582 B2
(45) Date of Patent: Mar. 22, 2016

(54) RENDERING A DATABASE RECORD IN A FIXED DISPLAY SPACE

(75) Inventors: David James Seager, Eastleigh (GB); Evan Garrick Jardine-Skinner, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 342 days.

(21) Appl. No.: 12/774,301

(22) Filed: May 5, 2010

(65) Prior Publication Data

US 2010/0306182 A1    Dec. 2, 2010

(30) Foreign Application Priority Data

May 27, 2009    (EP) .................................... 09161253

(51) Int. Cl.
  *G06F 7/00*    (2006.01)
  *G06F 17/30*    (2006.01)
(52) U.S. Cl.
  CPC ................................ *G06F 17/30554* (2013.01)
(58) Field of Classification Search
  CPC .................................................... G06F 17/212
  USPC ......................................................... 707/705
  See application file for complete search history.

(56) References Cited

U.S. PATENT DOCUMENTS

| | | | |
|---|---|---|---|
| 6,055,550 A * | 4/2000 | Wallack | G06F 17/246 715/229 |
| 6,320,602 B1 | 11/2001 | Burkardt et al. | |
| 6,879,987 B2 * | 4/2005 | Hsieh | G06F 17/30569 |
| 7,219,309 B2 * | 5/2007 | Kaasila | G06T 3/4015 715/209 |
| 7,315,988 B2 | 1/2008 | Cragun et al. | |
| 7,502,867 B2 * | 3/2009 | Mitchell | G06F 17/30905 709/203 |
| 7,831,925 B2 * | 11/2010 | Kaval | G06F 9/4443 715/246 |
| 7,996,766 B2 * | 8/2011 | Chiang | G06F 17/30905 709/203 |
| 2004/0100509 A1 * | 5/2004 | Sommerer | G06F 17/30905 715/864 |
| 2004/0100510 A1 * | 5/2004 | Milic-Frayling | G06F 17/30905 715/864 |
| 2004/0268269 A1 | 12/2004 | Breinberg | |
| 2006/0031761 A1 * | 2/2006 | Ohta | G06F 17/248 715/246 |
| 2006/0080289 A1 * | 4/2006 | Brunswig | G06F 17/30286 |
| 2006/0218489 A1 | 9/2006 | Ovetchkine et al. | |
| 2007/0143241 A1 * | 6/2007 | Israel | G06Q 10/06 |
| 2007/0209019 A1 * | 9/2007 | Kaval | G06F 9/4443 715/788 |
| 2007/0288843 A1 * | 12/2007 | Makino | G06F 17/212 715/243 |
| 2010/0029340 A1 * | 2/2010 | Klassen | G06F 17/30905 455/566 |

* cited by examiner

*Primary Examiner* — Binh V Ho
(74) *Attorney, Agent, or Firm* — Steven L. Nichols; Fabian Vancott

(57) ABSTRACT

Rendering a database record having a plurality of fields in a fixed display space includes: with a physical processor configured to access and display the database record, allocating to each field in the database record a maximum display length having an initial value equal to a string length of the fixed display space divided by the number of fields in the database record; and displaying in the fixed display space a portion of each field in the database record such that the displayed portion of any field is no longer than the maximum display length allocated to that particular field.

22 Claims, 6 Drawing Sheets

| WSDL Document Policy Attachments |
| --- |
| WSDL Document name = "Embedded..." namespace = "http://to..." version = "" |

*Fig. 6A*

| WSDL Document Policy Attachments |
| --- |
| WSDL Document name = "piese..." namespace = "http://..." version = "1.01..." |

*Fig. 6B*

RENDERING A DATABASE RECORD IN A FIXED DISPLAY SPACE

CROSS-REFERENCE TO RELATED APPLICATIONS

The present application claims priority pursuant to 35 U.S.C. §119(a) from Great Britain Patent Application No. 09161253.1, filed on May 27, 2009, which is incorporated herein by reference in its entirety.

BACKGROUND

Aspects of the present invention relate generally to the rendering and display of data, and more particularly to the rendering of a segmented record in a fixed display space.

A database is a collection of various data that are organized according to one or more classifications. Certain types of databases store and organize data according to a format based on individual records. Often, the data of these records are "segmented," such that each instance of a record is further divided into multiple fields. For example, in a service oriented architecture (SOA) system, multiple service documents may be retained in a service repository database, where each service document defines a service available from the system. Each service document may be divided into various fields which correspond to different aspects of the service described by that particular service document. These fields may describe, among other data, the location of the service, details of the service, and instructions for accessing the service.

In certain applications, it may be desirable to provide a human user with access to the records stored in a database through a user interface. Returning to the example of an SOA system, the service documents stored by a service repository database may be used by analysts, architects, and developers during development and modification of the SOA system to locate available services and evaluate the impact of changes to service configurations. As such, the contents of the service repository database are made available through a user interface utilizing a display device to display specific service documents to a user. In this type of user interface, display space on the display device may be a scare commodity, particularly when the service documents store large amounts of data.

BRIEF SUMMARY

A method of rendering a database record having a plurality of fields in a fixed display space includes: with a physical processor configured to access and display the database record, allocating to each field in the database record a maximum display length having an initial value equal to a string length of the fixed display space divided by the number of fields in the database record; and displaying in the fixed display space a portion of each field in the database record such that the displayed portion of any field is no longer than the maximum display length allocated to that particular field.

A system includes a processor; a database having multiple database records accessible to the processor; and a display device communicatively coupled to the processor. The processor is configured to render a database record in a fixed display space of the display device by: allocating to each of a plurality of fields in the database record a maximum display length having an initial value equal to a string length of the fixed display space divided by a number of the fields in the database record; and causing the display device to display in the fixed display space a portion of each field in the database record, such that the displayed portion of any field is no longer than the maximum display length allocated to that particular field.

A Service Oriented Architecture (SOA) system includes: a processor; a service registry and repository database having a plurality of service records; and a display device communicatively coupled to the processor. The processor is configured to render a service record in a fixed display space of a graphical user interface displayed by the display device by: allocating to each of a plurality of fields in the service record a maximum display length having an initial value equal to a string length of the fixed display space divided by a number of the fields in the service record; and causing the display device to display in the fixed display space a portion of each field in the service record, wherein the displayed portion of any field is no longer than the maximum display length allocated to that particular field.

A computer program product for rendering a database record having a plurality of fields in a fixed display space includes a computer readable storage medium having computer readable program code embodied therewith. The computer readable program code includes: computer readable program code configured to allocate to each of the fields in the database record a maximum display length having an initial value equal to a string length of the fixed display space divided by a number of the fields in the database record; and display in the fixed display space a portion of each field in the database record, wherein the displayed portion of any field is no longer than the maximum display length allocated to that particular field.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIGS. 6A and 6B are diagrams of illustrative rendered output of a method of truncating service registry messages according to exemplary embodiments of the principles described herein.

Throughout the drawings, identical reference numbers designate similar, but not necessarily identical, elements.

DETAILED DESCRIPTION

Figure 1:
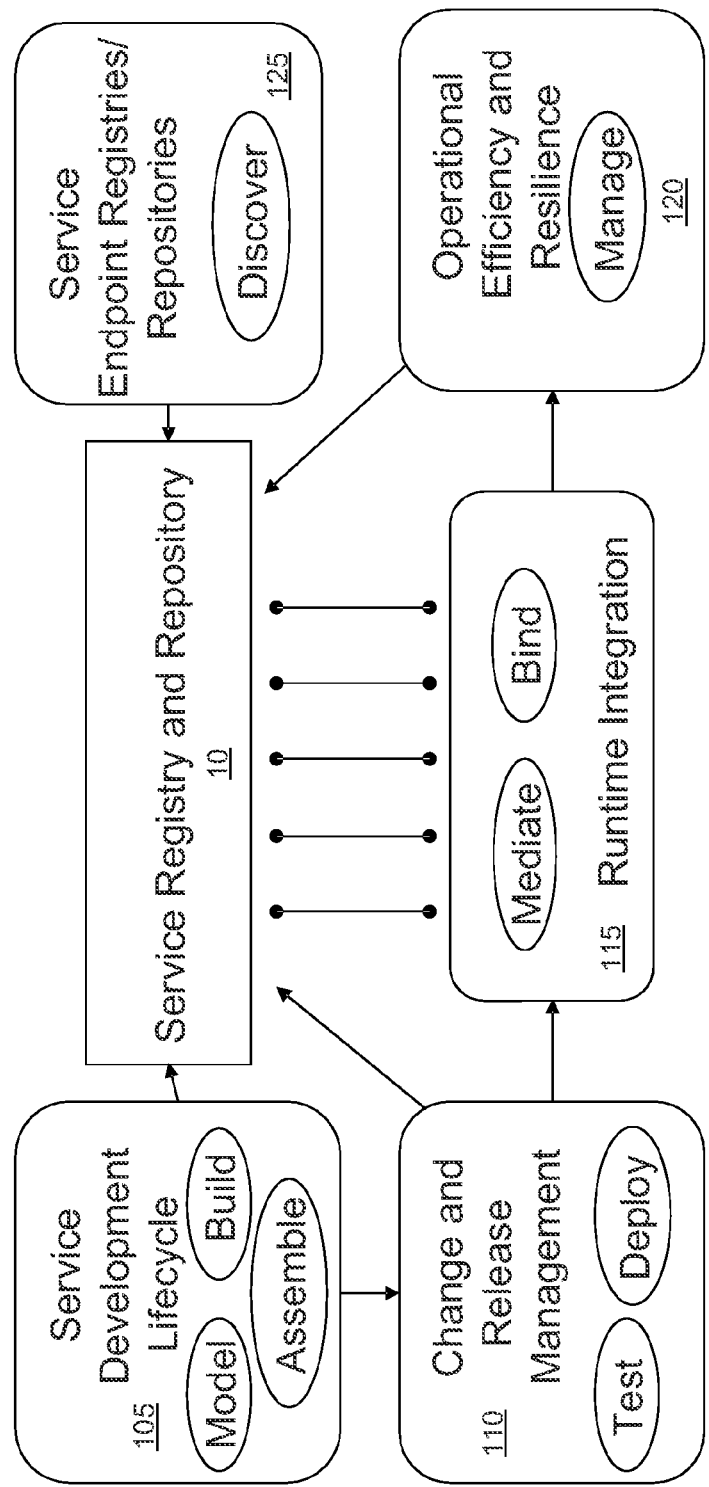
FIG. 1 is a diagram of illustrative service document phases in an illustrative service registry and repository according to one exemplary embodiment of the principles described herein.

The present specification discloses methods, systems, and computer program products for rendering a database record in a fixed display space.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be readily apparent from the following description that the principles of the present specification can be applied to the rendering of data from any type of segmented record to a fixed display space. While the following principles are described with respect to the rendering of service documents in an SOA system, it should be understood that the present specification further contemplates any embodiment where data from a segmented record is displayed in a fixed space.

FIG. 1 illustrates service life cycle phases of the services stored as documents in a service registry and repository of an SOA system. These life cycle phases include a service development phase 105 where the services are modelled, built, and assembled; a change and release management phase 110 where the services are tested and deployed; a runtime integration phase 115 where the service is mediated and bound; and an operation efficiency and resilience phase 120, where the efficiency and resilience of the service are managed, and a phase 125 where the service is discovered exposed to service endpoint registries and repositories.

In an SOA-based system, a service repository stores a service document and allows access to the document and the corresponding service. A service registry is an index of a subset of information about a service (for example the location and name of service document) enabling the corresponding service document to be located and accessed in a repository (or even the corresponding service located at the service provider). An integrated service registry and repository 10 allows a service operation to use both the indexed service information in the registry and the detailed service information in the repository. An example of an integrated service registry and repository 10 is IBM WebSphere® Registry and Repository (WSRR).

Such an integrated service registry and repository 10 has advantages of greater business agility and resilience through reuse than separate systems. Further advantages of looser coupling, greater flexibility, better interoperability, and better governance arise from the integration. These advantages are addressed by separating service descriptions from their implementations, and using the service descriptions across the life cycle of the service. Standards-based service metadata artifacts, such as Web Service Definition Language (WSDL), extensible mark-up language (XML) schema, policy or Service Component Architecture (SCA) documents, capture the technical details of what a service can do, how it can be invoked, or what it expects other services to do. Semantic annotations and other metadata can be associated with these artifacts to offer insight to potential users of the service on how and when it can be used, and what purposes it serves.

As the integration point for service metadata, the service registry and repository 10 establishes a central point for finding and managing service metadata acquired from a number of sources, including service application deployments and other service metadata and endpoint registries and repositories. It is where service metadata that is scattered across an enterprise is brought together to provide a single, comprehensive description of a service. Once this happens, visibility is controlled, versions are managed, proposed changes are analyzed and communicated, usage is monitored and other parts of the service architecture can access service metadata with the confidence that they have found the copy of record.

Software Architecture

In certain embodiments, the service registry and repository 10 may be a Java™ 2 Platform Enterprise Edition (J2EE) application that runs on a WebSphere Application Server 8 and uses an object database as a backing store to persist the service metadata. The service register and repository 10 takes advantage of the role-based access control so that role-based views and access control can be turned on when the service registry and repository is deployed as an enterprise-wide application.

Figure 2:
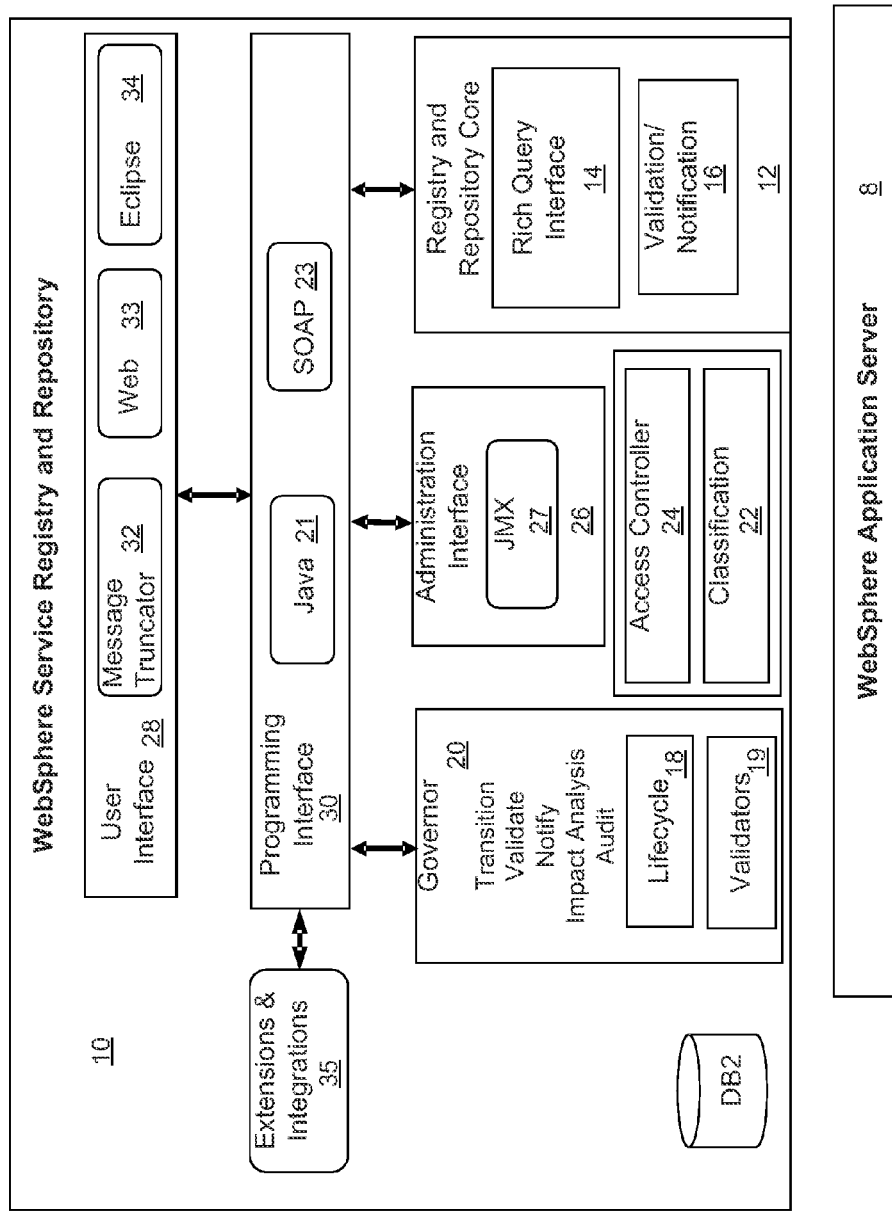
FIG. 2 is a diagram of an architecture of an illustrative integrated service registry and repository according to one exemplary embodiment of the principles described herein.

Referring to FIG. 2, the top level components of the service registry and repository 10 include a registry and repository core 12, a governor 20, an administration interface 26, a user interface 28, and a programming interface 30. The service registry and repository 10 may be implemented by an application server 8.

The registry and repository core 12 offers both registry function and repository function for service metadata, which is stored in database DB2. The repository function allows users to store, manage and query service metadata artifacts holding service descriptions. It not only takes good care of the documents containing service metadata by reliable persistence of the data, but it also provides a fine-grained representation of the content of those documents (for example, ports and portTypes in some service documents). The registry function makes provision for decorating registered service declarations and elements of the derived content models with user-defined properties, relationships, and classifiers. The registry and repository core provides a rich query interface 14 that makes use of those decorations when a search is performed to find entities such as a service endpoint or service interface.

Whenever a change to registry or repository content is detected by registry and repository core, it invokes all validation and notification functions that are registered in the validation and notification registers 16. Both kinds of function are considered extension mechanisms that can be used to customize how the service registry and repository reacts to changes. Validation function can be written and registered that the registry and repository core will execute when changes are made to the content. For example, a validation function that checks for completeness of a service definition. The registry and repository core 12 includes a notification plug-in (not shown) with a subscription capability for a notification communicating a change in the content of the service registry and repository.

Through the governor 20, the service registry and repository 10 supports a rich set of extensible governance functions, including the ability to model service life cycle model 18 for governed entities, define valid transitions between service states, write and plug-in validators 19 to guard the transitions between states, and designate (notification) actions to be taken as result of the transition. It also provides interfaces to analyze the impact of changes to content, and provides auditing of such changes.

The classification component 22 allows service descriptions and parts of service definitions to be annotated with corporate vocabulary and to capture the governance state. Service classification systems are captured in web ontology language (OWL) documents that are loaded into the Service Registry and Repository using the administrative interface. Service registry and repository entities can be classified with values from these classification systems, to allow classification-based queries to be performed, and to allow access restrictions based on classification.

The access controller 24 supports a fine-grained access control model that allows for the definition of which user roles can perform specific types of actions on corresponding artifacts. Visibility of services can be restricted by business area and user roles can be restricted from transitioning services to certain life cycle states. This is in addition to the role-based access control provided by the service registry and repository.

The administration interface 26 supports the import and export of repository content for exchange with other repositories and provide an API for configuration and basic administration. These support interactions with the access controller 24 and with the classification component 22.

User interface 28 comprises a web interface 33 and an eclipse plug-in interface 34 to enable user interaction with service registry and repository. In certain embodiments, the user interface 28 may further include a message truncator 32 to handle the message truncation function of the service registry. A servlet based web user interface (UI) supports is the main way for users representing different roles to interact with the service registry and repository. The web interface supports all user roles, offering lookup, browse, retrieve, publish, and annotate capabilities, as well as governance activities, such as import/export and impact analysis. A subset of this user interface is offered as an Eclipse plug-in to meet developer needs and analyst users needs that use Eclipse based-tooling. The Eclipse plug-in is used primarily for lookup, browse, retrieve and publish capabilities. The Web-based user interface can also be used for performing service metadata management and governance.

Programming interface 30 uses Java and SOAP (Service Oriented Architecture Protocol) APIs 21, 23 to interact programmatically with registry and repository core 12. These APIs provide basic create, retrieve, update and delete (CRUD) operations, governance operations, and a flexible query capability. The SOAP API is used to communicate content using XML data structures. The Java API is used to communicate content using service data object (SDO) graphs. Using either the user interface 30 or the programming interface 28 documents and concepts managed by WSRR can be created, retrieved, updated and deleted. However, logical entities in the logical model cannot be modified and these can only be changed by updating a document that contains the logical entity. Concepts can be created, retrieved and deleted.

In certain embodiments, the service registry and repository 10 may support two application programming interfaces (APIs) that can be used to interact with the registry and repository core 12; the governance component 20 and the administration interface 26: a Java-based API and a SOAP-based API respectively. Both APIs support publishing (creating and updating) service metadata artifacts and metadata associated with those artifacts, retrieving service metadata artifacts, deleting the artifacts and their metadata, and querying the content of the registry and repository. The programming APIs use Service Data Objects (SDO) to capture the data graphs inherent in the content model, allowing access to physical documents, logical parts of the physical documents, and concepts. The SOAP API uses XML documents to similarly represent Service Data Objects to communicate content structures in both the physical and logical model.

Path query expressions are used to perform searches with the query interface 14 for coarse- and fine-grained queries. Queries can be performed using semantic annotations, properties, and all or parts of physical service metadata artifacts. Fragments of metadata be returned (such as endpoints), all metadata be returned, and both metadata and documents be returned. In addition to "free-form" path based queries, a set of pre-canned queries are available to use to address common paths through the WSRR content model. A path expression identifies the type of managed entity to be returned and filters that capture the managed elements related to the desired object. Extensions and Integrations 35 are provided to include classification annotations in a query. For example, if the search is for all WSDLServices that have a port that refers to a binding that refers to a portType named "StockQuotePortType", the following query expression would be used:
/WSRR/WSDLService[port/binding/portType/
@name='StockQuotePortType'].

The governor 20 allows analysis of the impact of changes to specific artifacts through an API. A set of predefined impact queries is available to help you navigate through the registry and repository content according to popular patterns, such as which WSDL files import or use this XSD. In addition one can use Governance operations to request life cycle transitions for a governed entity as well as the configuration of e-mail notifications for users interested in specific content changes.

The administration interface 26 provides an administration API that supports basic configuration and loading and managing of metadata in support of repository content, such as classification and life cycle management. The administration API allows you to load definitions of state machines to be used to model the life cycle of governed entities, and to load classification systems described in OWL. In addition, the administration API supports registration of plug-ins for validation functions or additional notification functions.

Information Architecture

Figure 3:
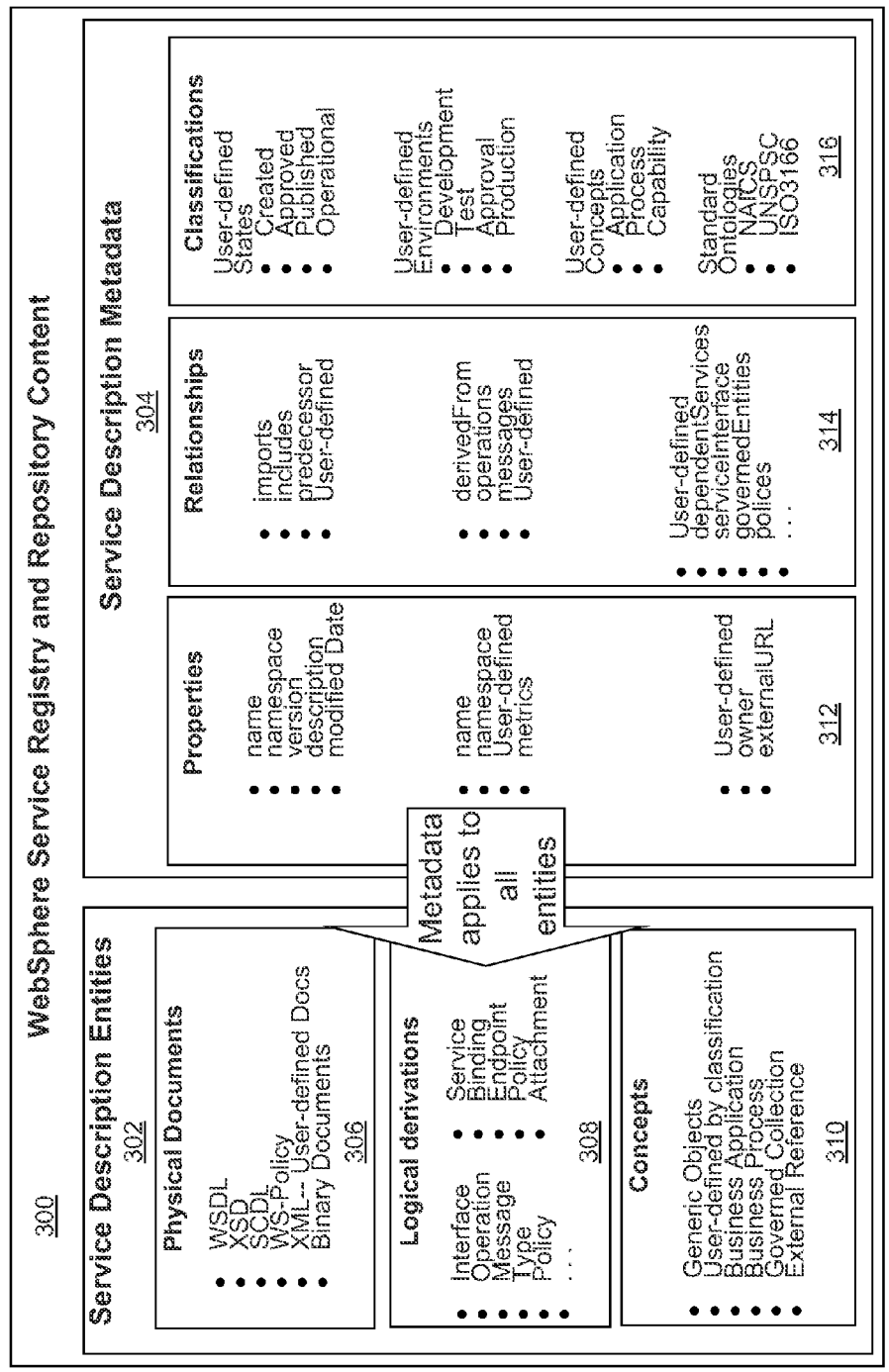
FIG. 3 is a diagram of an information architecture of an illustrative integrated service registry and repository according to one exemplary embodiment of the principles described herein.

Referring to FIG. 3, an informal description of Information Architecture 300 is provided. Broadly, information architecture 300 has entities representing service description entities 302 and service description metadata 304. All artifacts have an assigned URI, a name and a description. Examples of each type of artifact are shown in FIG. 3 but are not necessarily referred to in the description.

Service Description Entities 302 comprises physical documents 306; logical derivations 308 and concepts 310. Physical Documents 306 are XML documents that are known as service metadata artifacts. Logical derivations 308 are the finer-grained pieces of content that result when some types of physical document are shredded as they are loaded into Registry and Repository. Concepts 310 are generic entities that are usually typed, and represent anything that is not represented by a document in Registry and Repository. All three types of service description entities can be use in queries, have service annotations applied, and have relationships established from and to them.

The most elemental building blocks for the WSRR are the physical documents 306 such as XSD, WSDL, SCDL or WS-Policy documents. In addition any XML service metadata artifact type or binary document can be stored in WSRR and receive the benefits of broader visibility, reuse, management, and governance. The coarse-grained model made up from registry objects that represents those documents is referred to as the physical model. Documents are versionable objects in the WSRR content model, which means that in addition to a URI, name, and description, they also have a version property.

For some of the physical document types, WSRR derives logical objects and stores them in logical derivations 308. For instance, WSRR can "shred" a document upon receipt into a set of logical objects to enable users to explore WSRR content beyond the boundaries of the files stored. Logical objects are not versionable. For some physical document types, WSRR defines a predefined properties and detects relationships to other physical documents. An XSD document, for example, has a target Namespace property and the relationships with other imported XSD documents, other redefined XSD documents and other included XSD documents. When an entry for a certain physical document is created in WSRR, it is introspected for relationships to other artifacts. If not already represented in WSRR, a related artifact is also added, and in either case the relationship between the artifacts is recorded.

The set of logical derivations comprises the logical model of WSRR. The logical model has entities such as portType, port, and message related to WSDL files, and complexType or simpleType related to XSD documents. Elements of the logical model have properties and relationships reflecting a subset of their characteristics as defined in the underlying document. For example, a WSDLService element has a namespace property and a relationship to the ports it contains. It is important to note that all individual results of document shredding are aggregated into one logical model that represents not only the content of individual documents, but also relationships between content in different documents.

WSRR stores other types of service metadata using the XML Document, a generic document type. Documents of type XMLDocument are not decomposed into the logical model.

WSRR uses a concept to represent anything that does not have a physical document. Concepts 310 are used to represent a reference to content in some other metadata repository, such as a portlet in a portlet catalogue or an asset in an asset repository. It can also be used to group physical artifacts together to govern them as a unit; for example, concepts can be versioned.

In addition to content directly related to entities 302, WSRR supports a number of metadata types that are used to describe entities 302. These metadata types are referred to as service description metadata 304. WSRR supports three types of service semantic metadata types: properties 312; relationships 314; and classifications 316. All three types describe physical model entities, logical model entities, and/or concepts. For example, service description metadata can be used to associate a property "businessValue" with a physical model entity representing a WSDL file. It might also be used to define a new relationship "makesUseOf" between an entity in the logical model representing a "portType" and an entity in the physical model representing an XML document. Furthermore one could create a classification of "importantThings" and associate it with a "port" entity in the logical model and with an entity in the physical model representing a "Policy" document. This enables semantic queries to target individual elements of the service metadata, and meaningful dependency analyses to take place prior to making changes.

Properties 312 are simple name/value pairs that are associated with any of the Service Description Entities 302. Some properties are assigned by the system, such as the unique id, the owner, and the last time the service entity was changed. These system-assigned properties cannot be changed. Others are derived through the "shredding" of a key-type service description document into its logical model. Properties of this type include name and namespace. Sometimes these system-assigned values are allowed to be changed and properties can be created. Such a user-defined property can be used as a simple, unstructured and untyped extension mechanism. Properties 312 can be used in queries, and can be used to establish fine-grained access control.

Relationships 314 tie together one source service description entity to one or more target service description entities. Every relationship is given a name and a source is only allowed to have a single relationship with a given name. Some relationships are assigned by WSRR during the "shredding" of key types of documents. The relationship established between XSD documents based on the importing of one into the other is one such system-assigned relationship. Relationships can also be user defined. For example, a user can: relate a concept that represents an external object to a service using a user defined relationship; relate all of the service description documents that will be governed as a unit to a governable entity; and/or relate a monitoring policy to a service endpoint.

A user can load classification 316 into registry where they can then be used to apply semantic meaning to service description entities 302. Classification systems are documents encoded using the Web Ontology Language (OWL). The registry represents OWL Classes as classifiers and interprets the subTypeOf relationship between those Classes as establishing a classifier hierarchy. Other OWL concepts such as data or relationship representing properties or other built-in OWL relationships are ignored. A classification system is imported into the registry as a whole and updates are made by importing a modified version of the ontology. Any class in the underlying ontology can be used as a classification; the same classification can be used to classify multiple entities and an entity can be associated with multiple classifications.

Document Loader

Figure 4:
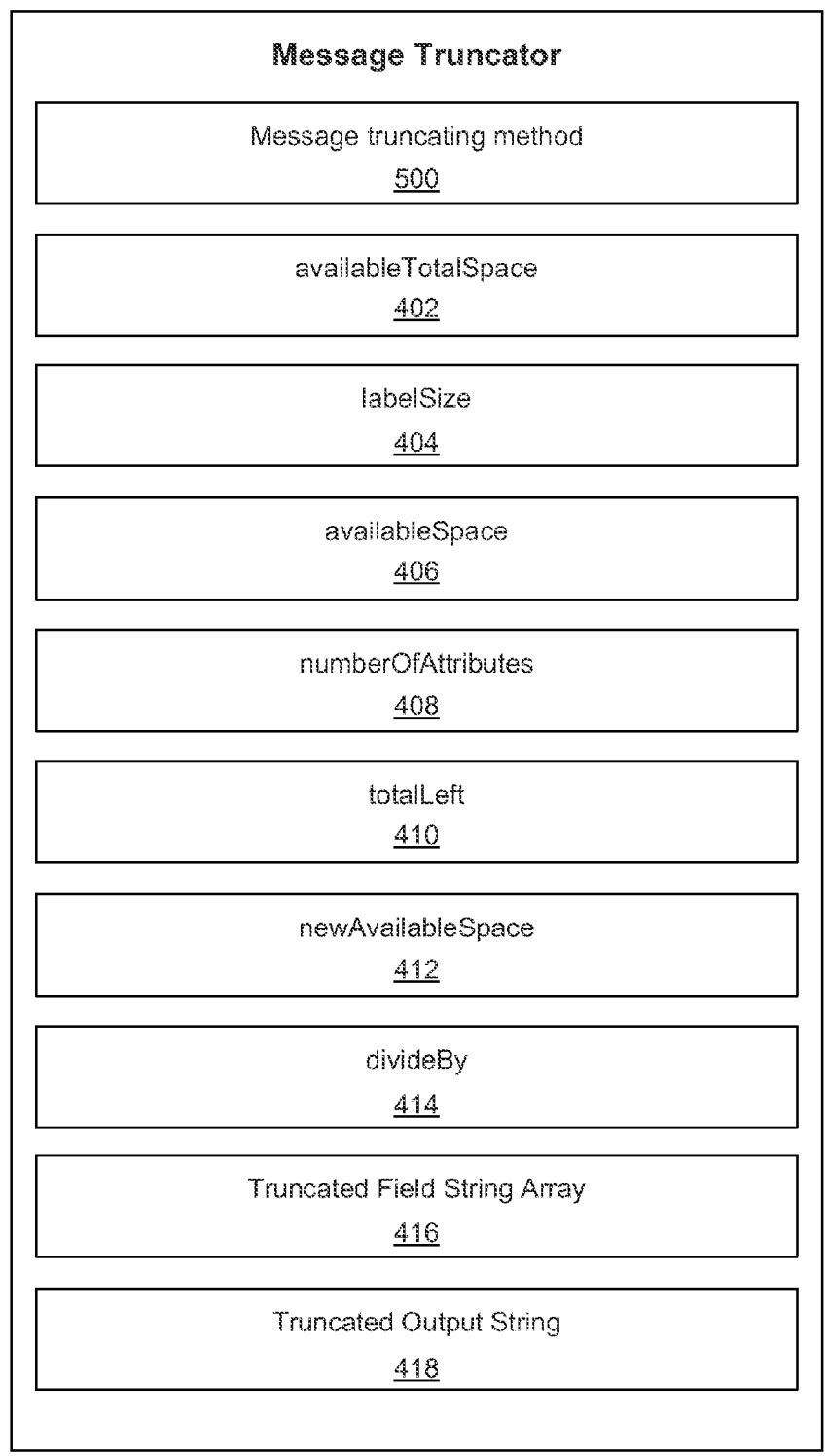
FIG. 4 is a diagram of a user interface of an illustrative integrated service registry and repository according to one exemplary embodiment of the principles described herein.

Referring to FIG. 4 there is shown message truncator 32 according to the certain embodiments comprising: Message truncating method 500; Register 402 for available total space (402 availableTotalSpace); Register 404 for label size (404 labelSize); register 406 for available space (406 availableSpace); register 408 for number of attributes (408 numberOfAttributes); Register 410 for total left space (410 totalLeft); Register 412 for new available space (412 newAvailableSpace); Register 414 for number of fields that the same as or larger than the average field space (414 divideBy); Register array 416 for the truncated field strings of each of the fields; and Register 418 for the truncated output string.

Figure 5:
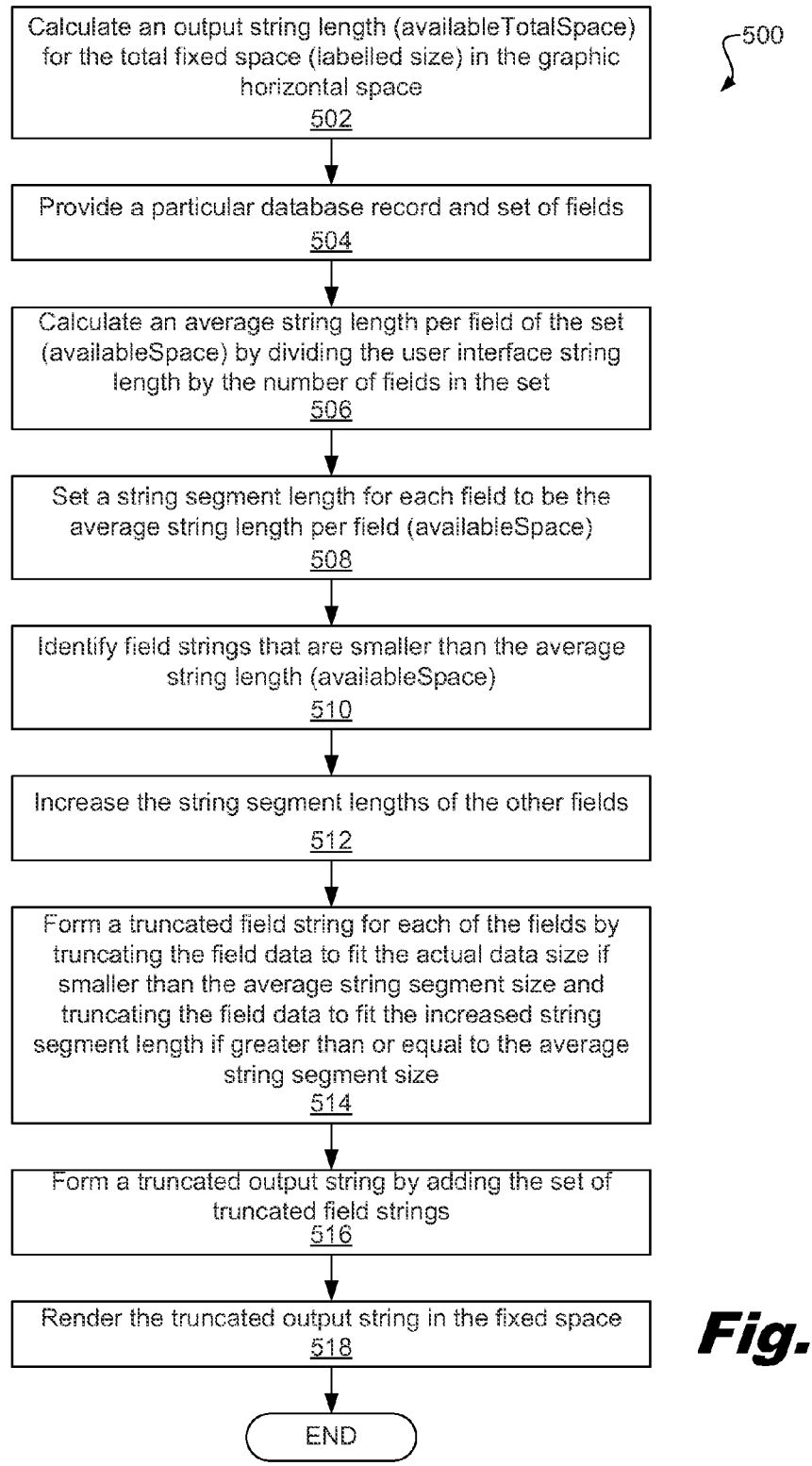
FIG. 5 is a diagram of an illustrative method of truncating service registry messages according to one exemplary embodiment of the principles described herein.

Message truncating method 500, described in detail below with reference to FIG. 5, is performed by the programming interface 30.

Register 402 holds the available total space (402 availableTotalSpace) for the space that the user interface has available for the field data.

Register 404 holds the size of the total fixed space in the horizontal graphical user interface (404 Size) that the user interface has available for all the information including the field labels and the field data.

Register 406 holds the value for the available space of the average string length per field of a set of fields (406 availableSpace).

Register 408 holds the number of fields (or attributes) in the set of fields (408 numberOfAttributes Register)

Register 410 for total left space (412 totalLeft Register) when the under sized fields have been considered Register 412 holds a value for the new available space for fields that that not under sized (410 newAvailableSpace Register), it is calculated by dividing 412 totalLeft by 414 divideBy.

Register 414 holds the number of fields that the same as or larger than the average field space (414 divideBy Register)

Array 416 holds the truncated field strings of each of the fields (Truncated Field String Array 416).

Register 418 holds the truncated output string (Tuncated Output String 418).

Referring to FIG. 5, there is shown a method flow 500 of the message truncator 14 according to certain embodiments of the principles described herein.

In step 502 an output string length (labelled availableTotalSpace) is calculated for the total fixed space (labelled size) in the graphical horizontal space. The output string length for the fixed space is the remaining length after the labels for the set of fields have been taken into account and forming the truncated output string by adding each label before its respective truncated field string. The size of all the labels which are not truncated is measured (labelSize). The available total space is then calculated as availableTotalSpace equals Size minus labelSize.

In step 504, there is provided a particular database query result in the form of a set of fields and corresponding labels.

In step 506 an average string length per field of the set (labelled availableSpace) is calculated by dividing the user interface string length by the number of fields in the set. The number of data elements is counted (numberOfAttributes). The available space for a single data element is then calculated as: availableSpace=(availableTotalSpace/numberOfAttributes)

In step 508 a string segment length for each field is set to be the average string length per field (availableSpace).

In step 510 truncated field strings are indentified that are smaller than the average string length (availableSpace), In step 512, the string segment lengths of the other fields are increased. This is achieved by calculating a new string segment length for the larger fields and truncating to the new length (newAvailableSpace). First the total free space minus the space needed by the data elements smaller than availableSpace is calculated (totalLeft). The number of data elements bigger than availableSpace is calculated (divideBy). To calculate totalLeft start with availableTotalSpace and for each data element: if the size the data element would take is less than availableSpace, reduce totalLeft by the size the data element would take and if the size the data element would take is more than availableSpace, increment divideBy Finally, if divideBy is greater than zero (that is there are data elements which need more space than availableSpace) then divide totalLeft by divideBy to calculate the space available for each of these elements. The value used to truncate each data element is newAvailableSpace. In this way all data elements are truncated using a single size. If they are smaller then they are not truncated. However, the algorithm described above takes this into account so that the total space taken up by all truncated elements will fit into the availableTotalSpace.

In step 514 a truncated field string is formed for each of the fields by truncating the field data to fit the actual data size if small than the average string segment and truncating the field data to fit the increased string segment length if the same as or larger than the average string segment size. In step 516 a truncated output string is formed by adding the set of truncated field strings. In step 518 the truncated output string is rendered in the fixed space.

The present example describes a constant label size because it is very useful to display meaningful labels. However, in alternate embodiments it may be okay to dispense with the labels entirely. In a further embodiment the labels can be truncated with the field data such that for each field, forming a truncated field string by additionally truncating the field label as well as the field data to fit the string segment length for that field.

In certain embodiments it may be desirable to truncate a field string which is smaller than the average string length because this optimizes the fixed space that is available, however, a different embodiment might not have this feature and still fall within a broad definition of the invention.

In certain embodiments it may be desirable to include the full labels as is in the output string, however, an alternate embodiment may truncate the labels as well as the fields or may leave the fields out of the output string entirely.

The present example is described in terms of a graphical user interface but the principles of the present specification may be utilized in any user space where there is limited user space. For instance, where the space is audible user space the limitation would be on the number of seconds of speech.

The present example is described in the terms of a service register where the invention is particularly advantageous because of the large numbers of different permutation of fields that would be rendered means that an automated configuration would be more than helpful. For such a database here is no one display configuration that would suit every permutation and a dynamic configuration is essential. However, the invention may be utilized in to advantage in any data processing application that has a limited user space and in particular a data processing application with large numbers of different permutations of data type are displayed to a user.

EXAMPLE

A simple successful import is described with reference to FIGS. 6A and 6B. FIG. 6A shows the rendered output of 3 data fields: name; namespace; and version. The "version" label has no value so its space is used to make the "name" and "namespace" labels larger. FIG. 6B shows the rendered output the same three data fields when the version field has a value and so all the data elements are truncated equally because none are shorter than the available space.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method of rendering a database record comprising a plurality of fields in a fixed display space, said method comprising:

with a physical processor configured to access and display said database record:

calculating an output string length by determining a length of said fixed display space and subtracting a total length of each label associated with each field in said database record;

calculating an average string length for a string for each of said fields by dividing the output string length by the number of fields in said database record;

allocating to each of said fields in said database record a maximum display length equal to, at most, the average string length; and displaying in said fixed display space a portion of each said field in said database record, wherein said displayed portion of any said field is no longer than said maximum display length allocated to that particular said field;

wherein said portion of at least one field displayed in said fixed display space comprises a truncated label, the truncation of the label resulting from the allocated maximum display length.

2. The method of claim 1, further comprising adjusting said maximum display length for at least one said field in said database record according to a string length of said at least one field with said physical processor.

3. The method of claim 2, wherein said adjusting said maximum display length for said at least one field in said database record comprises, for each said field in said database record with a string length shorter than said initial value of said maximum display length, reducing said maximum display length for said field to said string length of said field.

4. The method of claim 3, wherein said adjusting said maximum display length for at least one field in said database record further comprises increasing said maximum display length of at least one said field in said database record with a string length longer than said initial value of said maximum display length.

5. The method of claim 4, wherein said increasing said maximum display length of said at least one field with a string length longer than said initial value of said maximum display length further comprises increasing said maximum display length of each said field in said database record with a string length longer than said initial value of said maximum display length.

6. The method of claim 4, wherein a total increase of said maximum display lengths for said database records with a string length longer than said initial value of said maximum display length is no greater than a total reduction of said maximum display lengths for said database records with a string length shorter than said initial value of said maximum display length.

7. The method of claim 1, wherein said fixed display space comprises a portion of a graphical user interface displayed to a user and controlled by said physical processor.

8. The method of claim 1, wherein said database comprises a web service register.

9. A system, comprising:
a processor;
a database comprising a plurality of database records accessible to said processor; and
a display device communicatively coupled to said processor;
wherein said processor is configured to render a said database record in a fixed display space of said display device by:
calculating an output string length by determining a length of said fixed display space and subtracting a total length of a number of labels associated with each field in at least one of said database records;
calculating an average string length for a string for each of said fields by dividing the output string length by the number of fields in said database record;
allocating to each of a plurality of fields in said database record a maximum display length equal to, at most, the average string length; and
causing said display device to display in said fixed display space a portion of each said field in said database record, wherein said displayed portion of any said field is no longer than said maximum display length allocated to that particular said field;
wherein said portion of at least one field displayed in said fixed display space comprises a truncated label resulting from the label being longer than the maximum display length.

10. The system of claim 9, wherein said processor is further configured to adjust said maximum display lengths for at least one said field in said database record according to a string length of said at least one field.

11. The system of claim 10, wherein said adjusting said maximum display length for at least one field in said database record comprises, for each said field in said database record with a string length shorter than said initial value of said maximum display length, reducing said maximum display length for said field to said string length of said field.

12. The system of claim 11, wherein said adjusting said maximum display length for at least one field in said database record further comprises increasing said maximum display length of at least one said field in said database record with a string length longer than said initial value of said maximum display length.

13. The system of claim 12, wherein said increasing said maximum display length of said at least one field with a string length longer than said initial value of said maximum display length further comprises increasing said maximum display length of each said field in said database record with a string length longer than said initial value of said maximum display length.

14. The system of claim 9, wherein said fixed display space comprises a portion of a graphical user interface controlled by said processor.

15. The system of claim 9, wherein said database comprises a web service register.

16. A Service Oriented Architecture (SOA) system, comprising:
a processor;
a service registry and repository database comprising a plurality of service records; and
a display device communicatively coupled to said processor;
wherein said processor is configured to render a said service record in a fixed display space of a graphical user interface displayed by said display device by:
calculating an output string length by determining a length of said fixed display space and subtracting a total length of a number of labels associated with each field in at least one of said service records;
calculating an average string length for a string for each of said fields by dividing the output string length by the number of fields in said service record;
allocating to each of a plurality of fields in said service record a maximum display length equal to, at most, the average string length; and
causing said display device to display in said fixed display space a portion of each said field in said service record, wherein said displayed portion of any said field is no longer than said maximum display length allocated to that particular said field;
wherein said portion of at least one field displayed in said fixed display space comprises a truncated label and wherein the label is truncated based on the maximum display length allocated to a field associated with the label.

17. The SOA system of claim 16, wherein said processor is further configured to adjust said maximum display lengths for at least one said field in said service record according to a string length of said at least one field.

18. The SOA system of claim 17, wherein said adjusting said maximum display length for at least one field in said service record comprises, for each said field in said service record with a string length shorter than said initial value of said maximum display length, reducing said maximum display length for said field to said string length of said field.

19. The SOA system of claim 18, wherein said adjusting said maximum display length for at least one field in said service record further comprises increasing said maximum display length of at least one said field in said service record with a string length longer than said initial value of said maximum display length.

20. The SOA system of claim 19, wherein said increasing said maximum display length of said at least one field with a string length longer than said initial value of said maximum display length further comprises increasing said maximum display length of each said field in said service record with a string length longer than said initial value of said maximum display length.

21. The SOA system of claim 16, wherein said fixed display space comprises a portion of a graphical user interface configured to allow a user to view services available in said SOA system.

22. A computer program product for rendering a database record comprising a plurality of fields in a fixed display space, said computer program product comprising:
- a computer readable storage medium having computer readable program code embodied therewith, said computer readable program code comprising:
  - computer readable program code configured to:
    - calculate an output string length by determining a length of said fixed display space and subtracting a total length of a number of labels associated with each field in said database record;
    - calculate an average string length for a string for each of said fields by dividing the output string length by the number of fields in said database record;
    - allocate to each of said fields in said database record a maximum display length equal to, at the most, the average string length; and
    - display in said fixed display space a portion of each said field in said database record, wherein said displayed portion of any said field is no longer than said maximum display length allocated to that particular said field;

wherein said fixed display comprises a truncated label resulting from the label exceeding the maximum display length allocated that particular field.

* * * * *